United States Patent Office 2,911,406
Patented Nov. 3, 1959

2,911,406

3-HYDRAZINO-1,2,4-BENZOTRIAZINES AND 1-OXIDES THEREOF

George P. Mueller, Park Ridge, Ill., assignor to G. D. Searle & Co., Chicago, Ill., a corporation of Delaware No Drawing. Application June 30, 1958
Serial No. 745,252

5 Claims. (Cl. 260—249.5)

This invention relates to a new class of benzotriazines, and is particularly concerned with 3-hydrazino-1,2,4-benzotriazines which can be represented by the structural formula

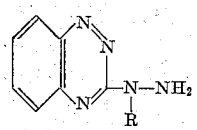

and with the 1-oxides thereof, which can be represented by the structural formula

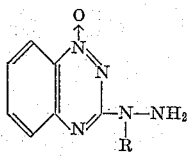

The compounds of this invention can also be represented by structural formulas which are tautomeric with, and consequently equivalent to, the formulas given hereinbefore. In the foregoing structural formulas R can represent hydrogen or a lower alkyl radical. When R is a lower alkyl radical, it can represent methyl, ethyl or straight- or branched-chain propyl, butyl, pentyl, hexyl, heptyl, or octyl.

Among the compounds suitable as starting materials for the manufacture of compositions of this invention are halogen substitution products of 1,2,4-benzotriazine, representatively 3-chloro-1,2,4-benzotriazine and 3-bromo-1,2,4-benzotriazine, described by Arndt and Rosenau, Berichte der Deutschen Chemischen Gesellschaft, 50, 1248 (1917). Treatment of such a 3-halo-1,2,4-benzotriazine, suitably in solution in a hydroxylic solvent such as ethanol, with hydrazine results in the formation of the desired 3-hydrazino-1,2,4-benzotriazine. When a monoalkylated hydrazine is employed as a reactant, the condensation occurs preferentially at the alkyl-substituted nitrogen atom, with the formation of a 3-(α-alkylhydrazino)-1,2,4-benzotriazine.

Another suitable starting material for the manufacture of compounds of this invention is the 3-amino-1,2,4-benzotriazine-1-oxide described by Arnt, Berichte der Deutschen Chemischen Gesellschaft, 46, 3522 (1913). Diazotization of this compound with sodium nitrite in a reaction medium comprising a hydrogen halide and a catalyst which promotes the replacement of the diazonium group by halogen affords a 3-halo-1,2,4-benzotriazine-1-oxide. Representatively, 3-chloro-1,2,4-benzotriazine-1-oxide is obtained in this manner by procedures described in greater detail hereinafter. This compound is an active pharmacological agent, and is effective in inhibiting the formation of granulomatous lesions. Condensation of 3-chloro-1,2,4-benzotriazine-1-oxide with hydrazine and with monoalkylated hydrazines leads to the formation of, respectively, 3-hydrazino-1,2,4-benzotriazine-1-oxide and 3-(α-alkylhydrazino)-1,2,4-benzotriazine-1-oxide.

The organic bases described herein form non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids.

The compounds of this invention have useful pharmacological properties, and specifically exhibit the eosinopenic effect and anti-inflammatory action characteristic of cortisone in relieving hyperemia of the eye.

This invention will appear more fully from the examples which follow. These examples set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

A solution of 1 part of 3-chloro-1,2,4-benzotriazine in 4 parts of ethanol is treated by the addition, in small portions, of a total of 0.5 part of hydrazine hydrate. Crystallization proceeds during the course of the reaction, and the mixture is finally converted to a crystalline mass. The product is dissolved by the addition of about 30 parts of hot ethanol. The resulting solution is cooled, and when crystallization is complete, the product is collected on a filter. For purification this crude product is extracted with hot benzene, and the resulting solution is filtered from a small amount of white, insoluble material. When the filtrate is cooled and allowed to stand, it deposits flat, golden needles of 3-hydrazino-1,2,4-benzotriazine which are collected on a filter and washed with benzene. This compound melts at about 173–175° C. and has the structural formula

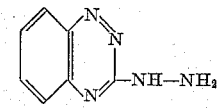

Example 2

A refluxing solution of 5 parts of 3-chloro-1,2,4-benzotriazine in 120 parts of ethanol is treated by the addition of 5 parts of methylhydrazine. The darkly colored reaction mixture is maintained under reflux for 15 minutes and is then concentrated to dryness in a nitrogen atmosphere. A solution of the residue in 45 parts of benzene is diluted with about 35 parts of petroleum ether. The clear solution is separated from the insoluble oil by centrifugation and is refrigerated until separation of the crystalline product is complete. Further purification by recrystallization from a mixture of benzene and cyclohexane yields a product which is substantially 3-(α-methylhydrazino)-1,2,4-benzotriazine melting at about 85–90° C. This compound has the structural formula

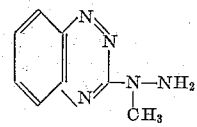

Example 3

A mixture of 13.5 parts of 3-bromo-1,2,4-benzotriazine, 400 parts of ethanol and 16 parts of propylhydrazine is heated under reflux for 15 minutes and is then concentrated to dryness in a nitrogen atmosphere. A solution of the residue in benzene is diluted with portions of petroleum ether until a small amount of oily material separates. This is removed by centrifugation and the clear solution is evaporated to dryness. The residue thus obtained is purified by crystallization from a mixture of benzene and cyclohexane to yield 3-(α-propylhydrazino)-1,2,4-benzotriazine of the structural formula

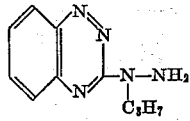

*Example 4*

A solution of 5 parts of 3-amino-1,2,4-benzotriazine-1-oxide in 120 parts of warm, concentrated hydrochloric acid is cooled in an ice bath and 3 parts of cuprous chloride is added. The resulting black solution is treated by the addition of a cooled solution of 3 parts of sodium nitrite in 30 parts of water, added in small portions. The solution is maintained at 5–10° C. for 30 minutes and is then diluted with a total of 150 parts of water, added in small portions. A yellow precipitate appears in the mixture. This suspension is heated to about 80° C., cooled and extracted with a total of 425 parts of ether in 4 portions. The ethereal extract is dried, filtered and concentrated to dryness. The residue is extracted with 170 parts of petroleum ether, and the resulting solution is filtered from a yellow, insoluble material. The filtrate is concentrated to a small volume and allowed to stand until separation of the crystalline product is complete. Further purification of this product by successive recrystallizations from aqueous methanol and from cyclohexane, or by chromatography on a silica gel column, affords, 3-chloro-1,2,4-benzotriazine-1-oxide melting at about 118–120° C. This compound has the structural formula

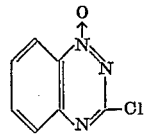

*Example 5*

A solution of 6 parts of 3-amino-1,2,4-benzotriazine-1-oxide in 120 parts of hot, concentrated hydrochloric acid is cooled to about 0–10° C. and treated by the addition of a cooled solution of 3 parts of potassium ferrocyanide and 3 parts of potassium ferricyanide in 50 parts of water. A solution of 3 parts of sodium nitrite in 30 parts of water is then added over a period of about one minute, whereupon there occurs an evolution of nitrogen and the formation of a yellow precipitate. After about 15 minutes the mixture is allowed to warm to about 25° C. and is diluted with an equal volume of water. Sodium bicarbonate is added until the pH is approximately 6, and the mixture is extracted with a total of 700 parts of ether in several portions. The ethereal extract is dried, filtered and concentrated to dryness. The residue deposited by evaporation of the ethereal solution is extracted with about 180 parts of hot petroleum ether, and the resulting solution is filtered from an insoluble residue, concentrated to about one-fourth of its original volume, and allowed to stand until separation of the crystalline product is complete. Further purification by recrystallization from aqueous methanol and from cyclohexane yields 3-chloro-1,2,4-benzotriazine-1-oxide, identical with the product of Example 4.

*Example 6*

A solution of 4.5 parts of 3-chloro-1,2,4-benzotriazine-1-oxide in 120 parts of warm ethanol is treated by the rapid addition of 6 parts of hydrazine hydrate. The reaction mixture is quickly converted to a crystalline mass. The solvent is removed by evaporation in a nitrogen atmosphere, and the crystalline residue is washed by decantation with 450 parts of hot benzene. Purification of the remaining product by recrystallization from benzene affords 3-hydrazino-1,2,4-benzotriazine-1-oxide which begins to sublime at about 150° C. and melts with decomposition and gas evolution at about 207.5–209° C. This compound has the structural formula

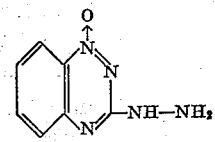

*Example 7*

A solution of 5 parts of 3-chloro-1,2,4-benzotriazine-1-oxide in 120 parts of hot ethanol is treated by the addition of 5 parts of methylhydrazine. The darkly colored reaction mixture is heated under reflux for 15 minutes and then concentrated to dryness in a nitrogen atmosphere. Purification of the crystalline residue by successive recrystallization from benzene and from mixtures of benzene with cyclohexane or with petroleum ether yields 3-(α-methylhydrazino)-1,2,4-benzotriazine-1-oxide. This compound melts at about 138–139° C. and has the structural formula

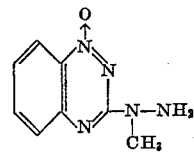

*Example 8*

A solution of 2 parts of 3-chloro-1,2,4-benzotriazine-1-oxide in 50 parts of hot ethanol is treated by the addition of 3 parts of ethylhydrazine. The reaction mixture is heated under reflux for 20 minutes and concentrated to dryness in a nitrogen atmosphere. Repeated crystallizations of the residue from benzene and from mixtures of benzene and cyclohexane afford 3-(α-ethylhydrazino)-1,2,4-benzotriazine-1-oxide of the structural formula

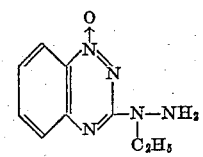

What is claimed is:
1. A member of the group consisting of the compounds of the structural formulas

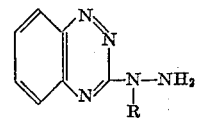

and

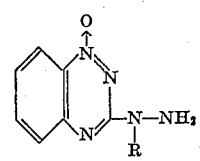

wherein R is a member of the group consisting of hydrogen and lower alkyl radicals.
2. 3-hydrazino-1,2,4-benzotriazine.
3. 3-(α-methylhydrazino)-1,2,4-benzotriazine.
4. 3-hydrazino-1,2,4-benzotriazine-1-oxide.
5. 3-(α-methylhydrazino)-1,2,4-benzotriazine-1-oxide.

No references cited.